US006997470B2

(12) United States Patent
Clutton (10) Patent No.: US 6,997,470 B2
(45) Date of Patent: Feb. 14, 2006

(54) PEDALLING APPARATUS

(76) Inventor: Peter David Clutton, 4 Washington Court, Robina, Gold Coast Queensland (AU) 4226

( * ) Notice: Subject to any disclaimer, the term of this patent is extended or adjusted under 35 U.S.C. 154(b) by 0 days.

(21) Appl. No.: 10/488,934

(22) PCT Filed: Aug. 30, 2002

(86) PCT No.: PCT/AU02/01200

§ 371 (c)(1),
(2), (4) Date: Mar. 15, 2004

(87) PCT Pub. No.: WO03/024771

PCT Pub. Date: Mar. 27, 2003

(65) Prior Publication Data

US 2004/0239158 A1    Dec. 2, 2004

(30) Foreign Application Priority Data

Sep. 17, 2001   (AU) .................................. PR7732

(51) Int. Cl.
*B62K 3/02*         (2006.01)
*B62K 19/36*        (2006.01)
(52) U.S. Cl. .................. 280/287; 297/215.13
(58) Field of Classification Search ................ 280/287, 280/288.4, 281.1; 292/202; 74/551.2–551.4; 482/57; 297/215.13, 195.1, 256.1, 256.11, 297/256.13
See application file for complete search history.

(56) References Cited

U.S. PATENT DOCUMENTS

| | | | | |
|---|---|---|---|---|
| 3,408,090 A | * | 10/1968 | Fritz et al. ................ | 280/278 |
| 4,218,090 A | * | 8/1980 | Hoffacker et al. .......... | 297/214 |
| RE35,335 E | * | 9/1996 | Calfee ...................... | 280/281.1 |
| 5,779,249 A | * | 7/1998 | Lin ........................... | 280/287 |
| 5,823,618 A | * | 10/1998 | Fox et al. .................. | 297/201 |
| 6,123,353 A | * | 9/2000 | Bennett et al. .......... | 280/281.1 |
| 6,193,309 B1 | * | 2/2001 | Gootter et al. ............. | 297/202 |
| 6,354,557 B1 | * | 3/2002 | Walsh ....................... | 248/600 |
| 6,499,800 B1 | * | 12/2002 | Morgan, Jr. ............. | 297/195.1 |
| 6,669,603 B1 | * | 12/2003 | Forcillo ..................... | 482/57 |

FOREIGN PATENT DOCUMENTS

| | | |
|---|---|---|
| DE | 4329795 | 3/1995 |
| DE | 29721591 | 2/1998 |
| DE | 20113316 | 11/2001 |
| JP | 2000135997 | 5/2000 |
| WO | WO 98/39201 | 9/1998 |

* cited by examiner

*Primary Examiner*—Tony Winner
(74) *Attorney, Agent, or Firm*—Hoffman, Wasso & Gitler, PC (57) ABSTRACT

A pedaling apparatus (10) including a frame assembly having a front and a rear sections with a hollow seat tube (12), and a seat post (18) supported by said seat tube (12). The seat post (18) has attachment means for attaching a seat (16). The seat post (18) and the seat tube (12) are supporting the seat (16) at an adjustable position relative to the rear section. The seat tube (12) has a substantially curved part to accommodate therein a compatible curved part of the seat post (18). The curved parts of the seat tube (12) and the seat post (18) are configured for telescopic adjustment of the position of the attached seat (16) along a curved trajectory path extending upwardly and rearwardly relative to said rear section to suit users of different heights and physiques. The apparatus (10) may have a pair of pedals (26) arranged so that the user is sitting in a substantially upright pedaling position on the seat and is far enough behind the pedals (26) to give the legs an uncramped and efficient pedaling action.

20 Claims, 5 Drawing Sheets

PEDALLING APPARATUS

TECHNICAL FIELD OF THE INVENTION

This invention relates to a pedalling apparatus with an improved seat positioning arrangement.

BACKGROUND OF THE INVENTION

Pedal bicycles, exercise bicycles, certain fitness equipment, and the like, generally (hereinafter referred to as "pedalling apparatus") have a seat for a user to sit on while pedalling. In an attempt to allow people of different physique to use the same pedalling apparatus, it is provided with an adjustably positionable seat arrangement. This seat arrangement has the seat clamped to one end of a seat post, and the opposite end of the seat post is adjustably positioned into a straight seat tube with little or no horizontal adjustment. As such, the prior art pedalling apparatus provides seat post adjustments only for the differences in the riders' leg lengths. Adjustments for differences in arm lengths and torso lengths are made in the forward frame section and the handlebars. The prior art apparatus also does not provide for adjustments to suit differences in torso lengths and arm lengths in riders of the same height. Furthermore, the seat arrangement of the prior art apparatus is not capable of providing adjustments to suit varying rider physiques whilst retaining enough space for the legs to pedal efficiently with the rider remaining seated in a position that provides correct anatomical support. Consequently, the prior art apparatus does nor provide sufficient beneficial adjustability for people of all physiques.

Many users of the prior art pedalling apparatus therefore continue to suffer pain and discomfort due to pedalling while sitting on a seat that is at an incorrect pedalling position for them. The incorrect pedalling position causes pain and discomfort for the riders and places the riders to pedal in an inefficient pedalling action which requires strenuous effort in pedalling, and thereby causes quick body exhaustion.

Designers of pedalling apparatus resort to use different frame sizes in order to allow more people to ride in the correct pedalling position. Some manufacturers have up to seven different frame sizes for a particular model of their pedalling apparatus. But, even with that many frame sizes, they are unable to provide all adjustments required to suit the variances in physique of all users. Moreover, making and stocking many different frame sizes are not cost efficient as more jigs and frame materials are required for manufacturing, and more storage space is required for wholesalers and retailers to stock pedalling apparatuses with many different frame sizes.

Most popular upright bicycles (mountain bikes, citybikes, hybrids) are therefore produced in a number of frame sizes. Examples of frame sizes of certain leading bicycle makers are:

Trek USA—FUEL 90 model: Men—S, M, L, XL Women—XS,SM 7200 FX model: Men—15", 17", 20", 22" Women—17",20"
Raleigh USA—SC200 model: Men—16", 18', 20", 22" Women—16",19"
Fuji—Regis model: Men—S, M, L Women—15",18"
Schwinn—Mesa GS model: Men—15", 17", 19', 21', 23'

Despite having a large number of frame sizes, customised adjustment in these bicycles is limited to the extent to which the seat post can be vertically adjusted in height and the minimal fore/aft adjustment of the seat using the universal "rails" system, plus the adjustment of the handle bar position. The adjustment does not provide fine, increment adjustment of the vertical and horizontal positioning of the seat to cater for varying torso, arm and leg lengths within the same height of riders and fails to provide easy, simultaneous adjustment in both planes.

The inventor has noted that the designs of the prior art pedalling apparatus as a whole do not provide correct anatomical support for the desired pedalling position. Examples of these designs are the "mountain bike" design, the hybrids/citybike design, and designs of certain exercise equipment.

Mountain Bike

The popular "mountain bike" design of bicycles uses an upright seat tube as the rear section of the frame and has a low-set handle bar at the front section. This design results in a "bent-spine" riding position with most of the rider's weight pulled forward onto the front part (horn or pommel) of the seat. The rider's weight is then supported by the perineum and central crotch area, whereby causing the rider to suffer considerable discomfort. This incorrect support of the rider also creates abrasion and chafing of the inner thighs, central crotch and the genitalia of the rider, causing pain and further discomfort. The correct support for the rider's weight is by the ischial tuberosities (sit bones).

The low-set handle bar of the mountain bike design causes the rider to bend his upper body forward in order to grasp the handle bar by the hands. Such bending causes cramping of the diaphragm and it places a lot of pressure on the hands and arms.

The bent-spine position also causes cramps to the body and an ineffective pedalling action. To produce a more effective pedalling action the rider must ride off the seat.

Hybrid/Citybike

Due to consumer reaction against the abovementioned disadvantages associated with the mountain bikes, the "hybrid" style bike has emerged, whilst citybikes continue to be used in Europe and Japan for many years.

These bikes have a higher handle bar and create less of the bent spine position in comparison to the mountain bikes. But they do not position the rider to receive the correct anatomical support and still place the rider too far forward to achieve optimum ease and efficiency in pedalling.

Exercise Equipment

Exercise/stationary bicycles and exercise equipment that are designed for the users to pedal in a fitness session, lack the capacity to position the riders to receive correct anatomical support. They do not provide sufficient adjustment of the seat to cater for a large range of different rider physiques.

Recumbent Style Bike

Recently recumbent style bikes have been developed in an attempt to overcome disadvantages caused by the mountain bikes and the hybrid/citybikes. This type of bikes places a rider in an almost prone position, with the pedals far forward of the rider's body. Whilst recumbent bikes provide a more efficient pedalling action, and greater support and comfort in seating, they are difficult to control and manoeuvre. They also have a safety problem as they are so low that drivers of vehicles have difficulty seeing them. As with other bikes, they lack sufficient seat adjustment to suit varying rider physique.

These bikes are also difficult to park, store, ship and transport.

OBJECT OF THE INVENTION

An object of the invention is to substantially alleviate or to reduce to a certain level one or more of the prior art disadvantages.

SUMMARY OF THE INVENTION

In one aspect therefore the present invention provides a pedalling apparatus comprising a frame assembly having a front section and a rear section with a hollow seat tube, and a seat post being supported by said seat tube and having attachment means for attaching a seat for a user to sit on whilst pedalling, the seat post and the seat tube being arranged for supporting the seat, when attached, at an adjustable position relative to the rear section, wherein the seat tube has a curved part arranged to accommodate therein a compatible and complementary curved part of the seat post, and wherein the curved parts of the seat tube and the seat post are configured for telescopic adjustment of the position of the attached seat along a curved trajectory path extending upwardly and rearwardly relative to said rear section, such that the seat position is selectively adjustable to suit any one of a range of users of different heights and physiques and further including pedals for said apparatus, and wherein said seat in all positions of said seat post along said curved trajectory path is positioned rearwardly of said pedals such that a user sitting on said attached seat at the selected seat position is behind the pedals which thereby provides an unhidered leg action in pedalling.

Preferably, the pedalling apparatus includes a rear drive wheel and the curved trajectory path extends upwardly and rearwardly over the rear wheel. The seat post is preferably adjustable relative to the seat tube to position said seat between a first front position, and a second rear position wherein the seat is located substantially above the axis of rotation of said rear drive wheel. Most preferably, the curved trajectory path is substantially concentric with the rear drive wheel.

Desirably, the pedalling apparatus further comprises a pair of pedals for pedalling, and the seat post and the frame assembly are arranged so that the user sitting on the seat is sufficiently far enough behind the pedals to give the legs an uncramped and efficient pedalling action and places the user in a substantially upright pedalling position.

The pedalling apparatus accordingly to this invention is suitably arranged to provide adjustability to the seat position for the user in order to suit his/her individual physique and to allow him/her to receive correct anatomical support and to have an efficient pedalling action whilst using a variety of front frame designs and handlebar types to suit the riders's personal preference in his/her ultimate riding style.

Such sitting position removes the requirements of the front horn or pommel usually found in the seat of the prior art pedalling apparatus. A suitable seat for this invention is subject of the applicant's U.S. Pat. No. 6,045,180, disclosure of which is fully incorporated herein by reference.

The pedalling apparatus typically has an adjustably positionable handlebar provided at the front section of the frame assembly. Adjustable positioning of the user behind the pedals in combination with the adjustable handlebar permit the user to obtain a seat position for a correct anatomical support. This also helps to remove pressure from the hands and arms.

The frame assembly may have a down tube arranged for supporting the handlebar. In one form the pedalling apparatus includes a head tube at said front section of the frame assembly and a handlebar stem having one end arranged for securing the handlebar and opposite end arranged for fixing in the head tube and adjustably positionable relative to the head tube. In this manner the height of the handlebar can be adjusted to suit each individual user.

The handlebar may have a substantially U-shaped mid section with a handle grip at each free end thereof. Said one end of the handlebar stem may be arranged so that the mid section of the handlebar is rotatable to a desired orientation before being secured at said orientation. This provides a fore and aft adjustment of the handlebar grips.

It is preferred that the seat is arranged to be tiltable relative to the seat post so that its tilt orientation relative to the seat post can be selectively adjusted.

Clamping means may be advantageously provided for clamping the seat post to said seat tube at any of said adjustable position.

The pedalling apparatus accordingly to this aspect of the invention can thus provide customised adjustment of the seat position upwardly and rearwardly with a single adjustment action. The arrangement of the seat post and the frame assembly can be made so that the seat position can be adjusted to suit a relatively large range of the height and physique variance in users. As such, manufacturers, wholesalers and retailers need to stock only two frame sizes for the height and physique variance expected in all users.

In a further aspect, the present invention provides a bicycle comprising a frame having a front section supporting a steerable front wheel and a rear section supporting a rear drive wheel, and a pedal assembly intermediate said front and rear sections, said rear section having a hollow seat tube, said seat tube extending upwardly and rearwardly from said pedal assembly, said seat tube having a curved end part and a seat post being supported by said seat tube, said seat post having a curved part complementary to said curved end part of said seat tube and being telescopically receivable therein, said seat post having at its free end attachment means for attaching a seat for a user, said seat post being adjustable telescopically along a curved trajectory path extending upwardly and rearwardly over said rear wheel between a first position in which said seat is arranged rearwardly of said pedal assembly and a second position substantially vertically aligned with the axis of rotation of said rear wheel whereby the position of said seat can be selectively adjustable to suit any one of a range of users of different heights and physiques such that a user sitting on said seat at a selected seat position is in a substantially uncramped pedalling position.

The front frame section suitably supports a handlebar which is adjustable in a fore and aft direction and in height whereby adjustment of the seat post and the handlebar permits a person seated on the seat to have his or her back substantially upright whilst pedalling. The rear frame section suitably includes seat stays supporting and extending downwardly from the free end of the seat tube and chain stays extending rearwardly from the pedal assembly and joining the seat stays at or adjacent the rotation axis of the rear wheel.

Preferably also the bicycle front frame section has a down tube extending downwardly towards the pedal assembly, a head tube fixed to the down tube, and a handlebar stem having one end arranged for securing the handlebar and an opposite end arranged for fixing in the head tube in an adjustably positionable manner relative to the head tube. The handlebar suitably has a substantially U-shaped mid section with a handle grip at each free end thereof, said one end of the handlebar stem being arranged so that the mid section of the handlebar is adjustably rotatable for fixing at a selected orientation, thereby providing a fore and aft adjustment of the handlebar grips.

The seat is suitably configured such that a person seated thereon is supported by the ischial tuberosities. Most preferably the seat is of the type in which a pommel or horn is absent. Preferably, the seat is arranged to be adjustably tiltable relative to the seat post for fixing at a selected tilt orientation.

Clamping means are suitably provided for clamping the seat post to the seat tube at a selected position relative thereto. Most preferably, the curved trajectory path is centered substantially on the axis of rotation of the rear wheel.

In yet a further aspect, the present invention provides pedalling apparatus comprising a frame assembly having a front section and a rear section with a hollow seat tube, and a seat post being supported by said seat tube and having attachment means for attaching a seat for a user to sit on whilst pedalling, the seat post and the seat tube being arranged for supporting the seat, when attached, at an adjustable position relative to the rear section, said rear section supporting a rear wheel and wherein the seat tube has a curved part arranged to accommodate therein a complementary curved part of the seat post, said curved parts of the seat tube and the seat post being configured for telescopic adjustment of the position of the attached seat along a curved trajectory path extending upwardly and rearwardly over said rear wheel, said curved trajectory path being centered substantially on or adjacent to the axis of rotation of said rear wheel, said apparatus further including pedals for a user to pedal, and wherein said seat in all positions of said seat post is positioned rearwardly of said pedals such that a user sitting on said attached seat at the selected seat position is rearwardly of the pedals to provide an unhindered leg action in pedalling.

The seat post is suitably adjustable relative to the seat tube to position the seat between a first front position, and a second rear position wherein the seat is located substantially above the axis of rotation of the rear drive wheel. The front section suitably includes a handlebar which is adjustable in a fore and aft direction and in height whereby adjustment of the seat post and the handlebar permits a person seated on the seat to have their back substantially upright whilst pedalling.

BRIEF DESCRIPTION OF THE DRAWINGS

In order that the system of the present invention can be readily understood and put in practical effect the description will now refer to the accompanying drawings which illustrate non-limiting embodiments of the present invention and wherein.

DETAILED DESCRIPTION OF THE DRAWINGS

Figure 1:
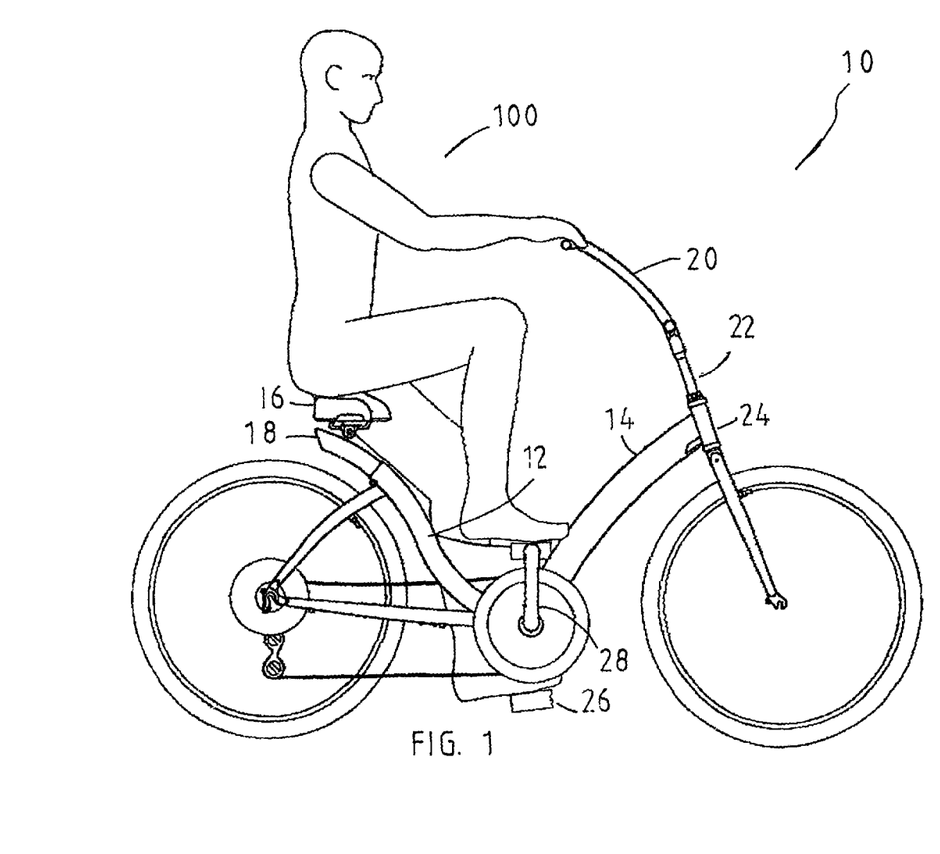
FIG. 1 is a schematic diagram showing a side view of a pedal bicycle according to the present invention.

Referring initially to the pedalling apparatus according one embodiment of the present invention shown in FIG. 1, there is shown a pedal bicycle 10 being used by a rider 100. The bicycle 10 has a frame assembly formed by a substantially curved seat tube 12 and a down tube 14, a seat 16 secured to a substantially curve seat post 18, a handlebar 20 secured to a handlebar stem 22 which is locked in a selected height within a head tube 24 of the frame assembly and a pair of pedals 26 joined to respective crank arms 28. Seat stays 40 support and extend downwardly from the free end of the seat tube 12 and chain stays 42 extend rearwardly from the pedals 26 to loin the seat stays 40 at or adjacent the rotation axis of the rear wheel of the bicycle 10.

As can be seen the rider 100 is seated well behind the pedals 26. Using the handlebar 20 with raised handgrips the rider 100 can pedal with a substantially straight back and has a correct anatomical support. In this position the rider 100 can pedal with optimum efficiency and power.

Figure 2:
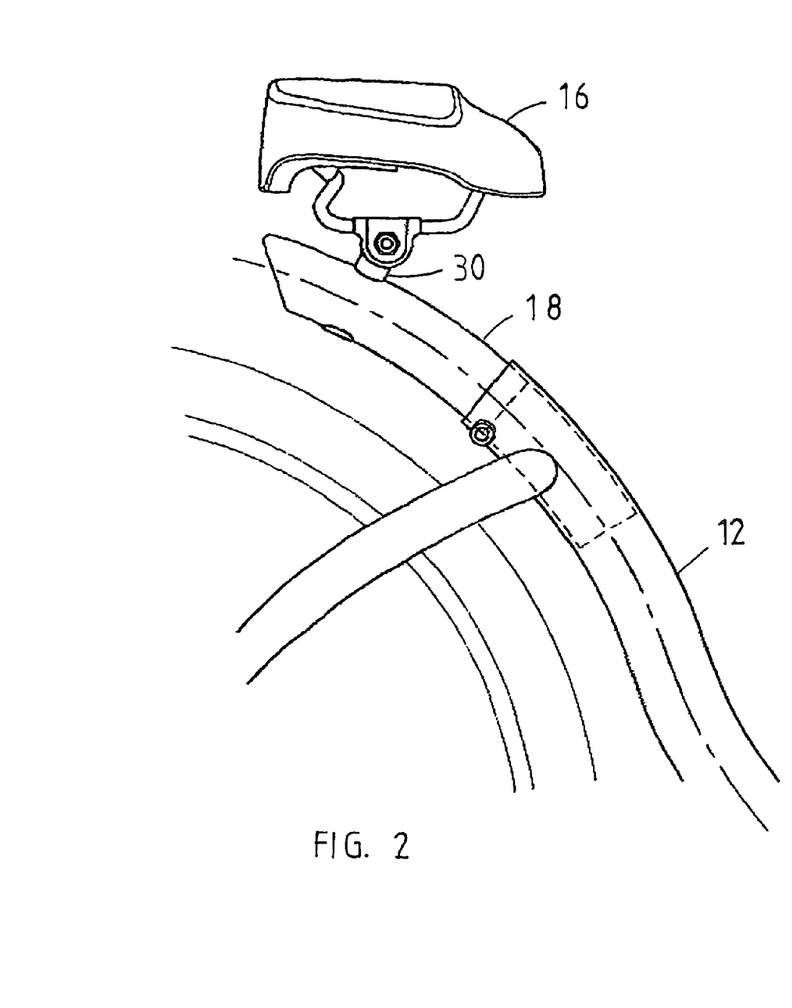
FIG. 2 shows details of the arrangement for adjusting the seat of the bicycle shown in FIG. 1 in the curved trajectory path.
Figure 3:
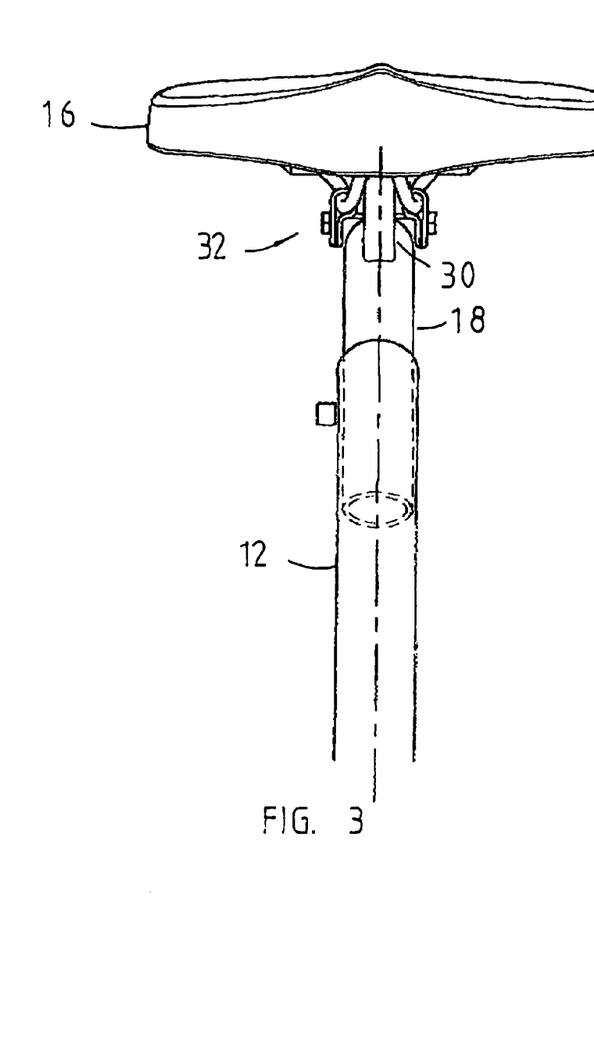
FIG. 3 is a front view of the arrangement shown in FIG. 2.

Turning to FIGS. 2 and 3, the seat 16 for this embodiment does not have the usual pommel as the rider 100 is supported by the ischial tuberosities. This seat 16 is based on the seat disclosed in the applicant's abovementioned United States patent.

The seat 16 is supported on an upstanding stud 30 by a clamping arrangement 32. The stud 30 and the clamping arrangement 32 are configured to allow a certain range of tilt adjustment of the seat 16. As the stud 30 is fixed to the upper end of the seat post 18, positioning of the post 18 relative to the seat tube 12 allows adjustment of the seat 16 in both the height and the fore/aft dimensions. Whilst not shown, it is understood that a clamping device is used to clamp the post 18 to the tube 12 in a position selected by the rider. The curved tube 12 and the post 18 determine a curved trajectory as shown by the dotted line in FIG. 1 and FIG. 2. The trajectory is determined to allow the bicycle 10 to be used in comfort by a large range of body physiques. Typically, the curved trajectory is of a radius R substantially centred on the axis of rotation of the rear wheel of the bicycle (see FIG. 1) such that the curved tube 12 or at least the end part thereof is substantially concentric with the rear wheel. Such an arrangement provides for the correct fore and aft adjustment of the position of the seat 16 accompanied by raising and lowering of the seat 16 to maintain the correct anatomical position of the rider of the bicycle as illustrated.

Figures 4, 5:
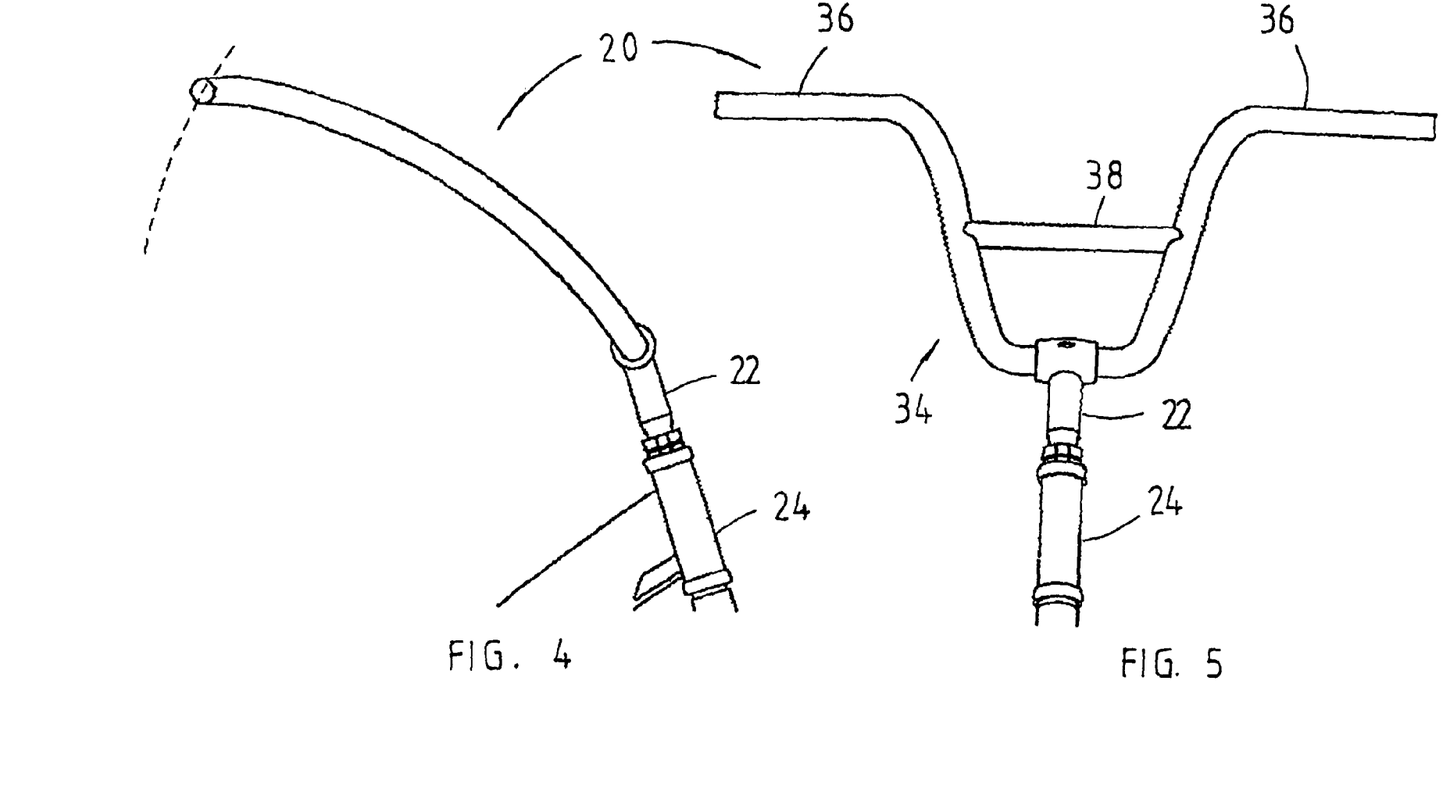
FIGS. 4 and 5 show details of the handlebar of the bicycle shown in FIG. 1.

Turning to FIGS. 4 and 5 the handlebar 20 for this embodiment has a substantially U-shaped mid section 34 and handgrips extending outwardly from free ends of the mid section 32. A brace member 38 is joined to the two arms of the mid section 32. The handlebar 20 is fixed in position by the handlebar stem 32, the height of which can be adjusted by positioning into the head tube 24 to a desired height and fixing it in that position by means well known in the art. As shown in FIG. 4 the angular position of the handlebar 20 can also be adjusted by rotating the handlebar 20 and then fixing it in the desired angular position.

Figure 6:
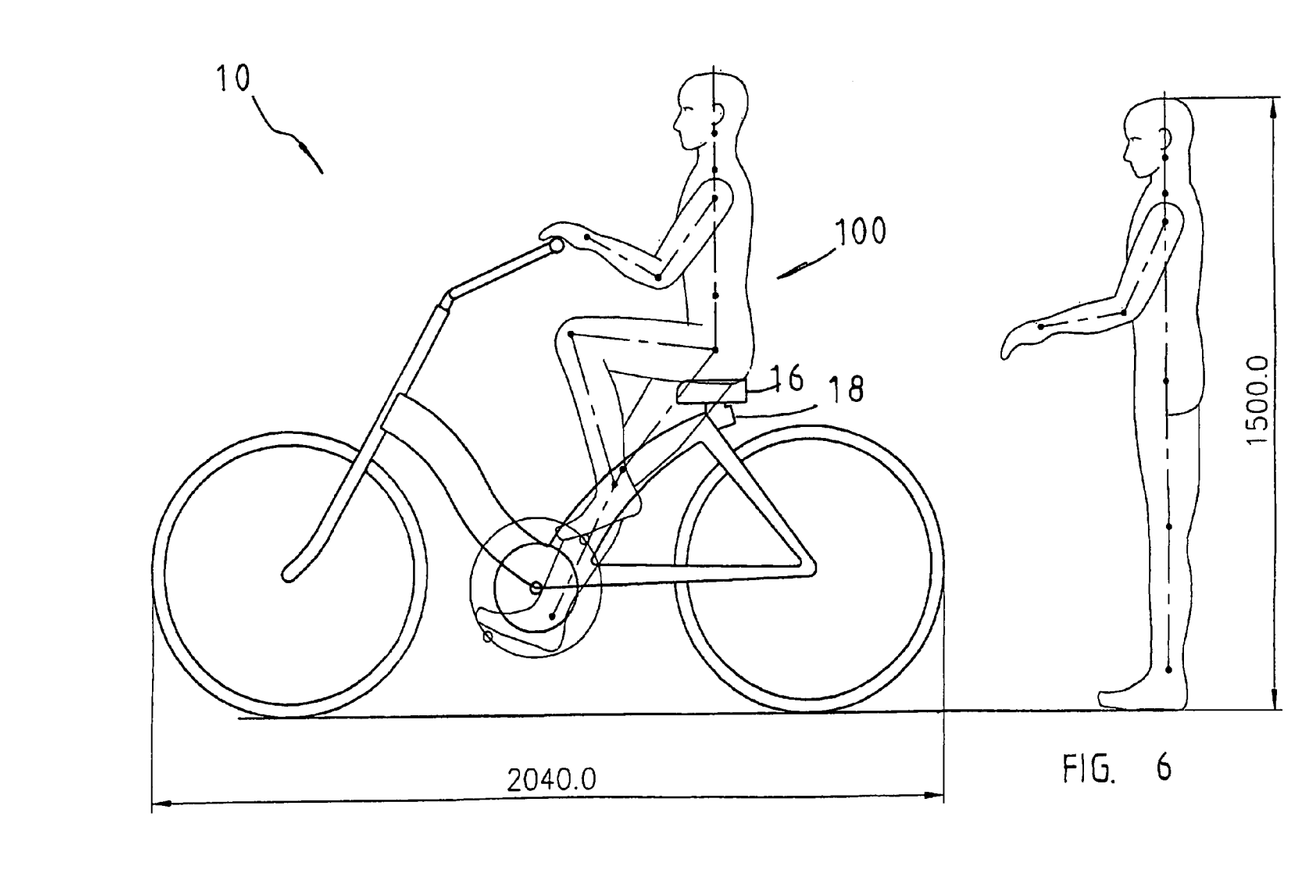
FIG. 6 shows the bicycle of FIG. 1 adjusted for use by a person of 1.5 metre height.
Figure 7:
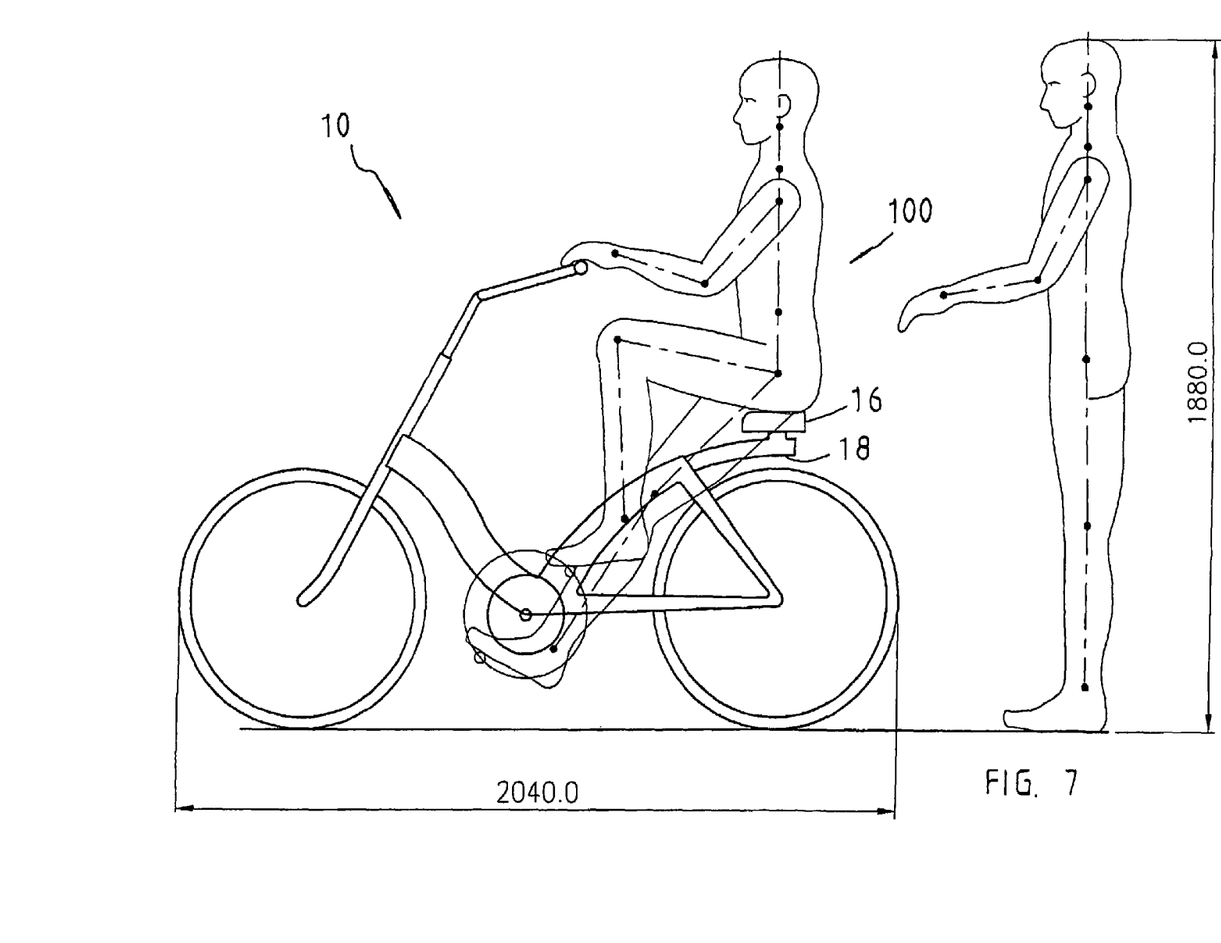
FIG. 7 shows the bicycle of FIG. 1 adjusted for use by a person of 1.88 metre height.

FIG. 6 shows the bicycle 10 being used by a rider 100 who is 1.5 metres tall. For comfort riding the post 18 is positioned substantially fully into the tube 12. For a user about 1.88 metre tall the post 18 is in an extended position as shown in FIG. 7. In both positions the respective riders are correctly supported and can pedal with optimum efficiently. It will be noted that in each case, and as is also apparent in FIG. 2, the seat 16 cannot be moved forwardly of any portion of the rear wheel of the bicycle 10 which ensures that the seat 16 is always positioned rearwardly of the pedals and cannot be moved over the pedals to an inefficient position for riding.

The inventor has used a computerised design process involving the use of anthropological data and biomechanical analysis on "Human Scale" modelling software to determine the geometry and the dimensions for (a) the bicycle frame, (b) the seat tube and seat post, (c) the pedals and cranks, and (d) the handle bar stems and the handle bars, to enable riders of all physiques to be seated in individual optimum riding positions, and to make fine adjustment to the seat position along said curve trajectory path suit differences in each rider's torso length, leg length and arm length.

Factors for the individual optimum riding position include the combination of:

(a) having the rider's body receiving skeletal support from directly beneath the ischial tuberosities (sit bones);
(b) being positioned sufficiently rearward relative to the pedals for removing or at least minimising cramping of the rider's legs and to provide maximum leverage from the legs for optimising pedalling efficiency;
(c) eliminating any interference with the legs during pedalling;
(d) removing pressure from the hands, arms and shoulders; and
(e) eliminating cramping of the diaphragm and restriction of lung function (breathing).

Human measurements, derived from the computerised design process, have shown that only two frame sizes of the apparatus manufactured to the present invention would be needed to provide sufficient adjustments of the seat position (riding position) to suit riders of all heights and physiques. A smaller frame can be made to suit riders up to 5' 10" and a larger frame to suit riders from 5' 8" and taller. The overlap between the two frame sizes is intended to cater for riders of the same height but having different arm lengths, leg lengths and torso lengths.

Whilst the above has been given by way of illustrative example of the present invention many variations and modifications thereto will be apparent to those skilled in the art without departing from the broad ambit and scope of the invention as herein set forth.

What is claimed is:

1. A pedalling apparatus comprising a frame assembly having a front section and a rear section with a hollow seat tube, and a seat post being supported by said seat tube and attachment means attaching a seat for a user to sit on whilst pedalling, the seat post and the seat tube being arranged for supporting the seat at an adjustable position relative to the rear section, wherein the seat tube has a curved part arranged to accommodate therein a compatible and complementary curved part of the seat post, and wherein the curved parts of the seat tube and the seat post are configured for telescopic adjustment of the position of the attached seat along a curved trajectory path extending upwardly and rearwardly relative to said rear section and on a radius centered on or adjacent the normal position of the axis of rotation of a rear wheel of said peddling apparatus whereby the seat position is selectively adjustable to suit any one of a range of users of different heights and physiques, and further including pedals and a handle for said apparatus, and wherein said seat in all positions of said seat post along said curved trajectory path is positioned rearwardly of said pedals such that a user sitting on said attached seat at the selected seat position is behind the pedals which thereby provides an unhindered leg action in pedalling and wherein said handle is positioned relative to said seat such that the user gripping said handle and seated on said seat has his or her back in a substantially upright position.

2. A pedalling apparatus as claimed in claim 1 and including a rear wheel and wherein said curved trajectory path extends upwardly and rearwardly over said rear wheel, said seat post being adjustable relative to said seat tube to position said seat between a first front position, and a second rear position wherein said seat is located substantially above the axis of rotation of said rear drive wheel.

3. The apparatus according to claim 1 wherein the front section has a down tube, a head tube fixed to the down tube, and a handlebar stem having one end arranged for securing the handlebar and an opposite end arranged for fixing in the head tube in an adjustably positionable manner relative to the head tube.

4. The apparatus according to claim 3 wherein the handlebar has a substantially U-shaped mid section with a handle grip at each free end thereof, said one end of the handlebar stem being arranged so that the mid section of the handlebar is adjustably rotatable for fixing at a selected orientation thereby providing a fore and aft adjustment of the handlebar grips.

5. The apparatus according to claim 1 wherein the attached seat comprises a seat with no front horn or pommel and is arranged to be adjustably tiltable relative to the seat post for fixing at a selected tilt orientation.

6. The apparatus according to claim 1 wherein clamping means are provided for clamping the seat post to said seat tube at any said adjustable seat position.

7. A bicycle comprising a frame having a front section supporting a steerable front wheel and a rear section supporting a rear drive wheel, and a pedal assembly intermediate said front and rear sections, said rear section having a hollow seat tube, said seat tube extending upwardly and rearwardly from said pedal assembly, said seat tube having a curved end part and a seat post being supported by said seat tube, said seat post having a curved part complementary to said curved end part of said seat tube and being telescopically receivable therein, said seat post having at its free end attachment means attaching a seat for a user, said seat post being adjustable telescopically along a curved trajectory path, said curved trajectory path being centred at or adjacent the axis of rotation of said rear wheel and extending upwardly and rearwardly over said rear wheel, said seat post being adjustable rearwardly from a position in which said seat is behind said pedal assembly and not forwardly of any portion of the rear wheel whereby the position of said seat can be selectively adjustable to suit any one of a range of users of different heights and physiques such that a user sitting on said seat at a selected seat position is in a substantially uncramped pedalling position.

8. A bicycle according to claim 7 wherein said front frame section supports a handlebar, said handlebar being adjustable in a fore and aft direction and in height whereby adjustment of said seat post and said handlebar permits a person seated on said seat to have his or her back substantially upright whilst pedalling.

9. A bicycle according to claim 8 wherein said rear frame section includes seat stays supporting and extending downwardly from the free end of said seat tube and chain stays extending rearwardly from said pedal assembly and joining said seat stays at or adjacent the rotation axis of said rear wheel.

10. A bicycle according to claim 9 wherein said front frame section has a down tube extending downwardly towards said pedal assembly, a head tube fixed to the down tube, and a handlebar stem having one end arranged for securing the handlebar and an opposite end arranged for fixing in the head tube in an adjustably positionable manner relative to the head tube.

11. A bicycle according to claim 10 wherein the handlebar has a substantially U-shaped mid section with a handle grip at each free end thereof, said one end of the handlebar stem being arranged so that the mid section of the handlebar is adjustably rotatable for fixing at a selected orientation, thereby providing a fore and aft adjustment of the handlebar grips.

12. A bicycle according to claim 7 wherein the seat is arranged to be adjustably tiltable relative to the seat post for fixing at a selected tilt orientation.

13. A bicycle according to claim 7 wherein clamping means are provided for clamping the seat post to said seat tube at a selected position relative thereto.

14. A bicycle as claimed in claim 7 wherein said seat is configured such that a person seated thereon is supported by the ischial tuberosities.

15. A bicycle as claimed in claim 14 wherein said seat has no pommel or front horn.

16. A pedalling apparatus comprising a frame assembly having a front section and a rear section with a hollow seat tube, and a seat post being supported by said seat tube, attachment means attaching a seat to said seat post for a user to sit on whilst pedalling, the seat post and the seat tube being arranged for supporting the seat at an adjustable position relative to the rear section, said rear section supporting a rear wheel and wherein the seat tube has a curved part arranged to accommodate therein a complementary curved part of the seat post, said curved parts of the seat tube and the seat post being configured for telescopic adjustment of the position of the attached seat along a curved trajectory path extending upwardly and rearwardly over said rear wheel, said curved trajectory path being centered substantially on or adjacent to the axis of rotation of said rear wheel, said apparatus further including pedals for a user to pedal, and wherein said seat in all positions of said seat post is positioned rearwardly of said pedals such that a user sitting on said attached seat at the selected seat position is rearwardly of the pedals to provide an unhindered leg action in pedalling.

17. Pedalling apparatus as claimed in claim 16 wherein said seat post is adjustable relative to said seat tube to position said seat between a first front position, and a second rear position wherein said seat is located substantially above the axis of rotation of said rear drive wheel.

18. Pedalling apparatus as claimed in claim 17 wherein said front section includes a handlebar, said handlebar being adjustable in a fore and aft direction and in height whereby adjustment of said seat post and said handlebar permits a person seated on said seat to have his or her back substantially upright whilst pedalling.

19. Pedalling apparatus as claimed in claim 16 wherein said seat has no front horn or pommel.

20. A bicycle comprising a frame having a front section supporting a steerable front wheel and a rear section supporting a rear drive wheel, and a pedal assembly intermediate said front and rear sections, said rear section having a hollow seat tube, said seat tube extending upwardly and rearwardly from said pedal assembly, said seat tube having a curved end part and a seat post being supported by said seat tube, said seat post having a curved part complementary to said curved end part of said seat tube and being telescopically receivable therein, said seat post having at its free end attachment means attaching a seat for a user, said seat having no front horn or pommel, said seat post being adjustable telescopically along a curved trajectory path, said curved trajectory path being centred at or adjacent the axis of rotation of said rear wheel and extending upwardly and rearwardly over said rear wheel, and wherein said seat in all positions of said seat post is positioned rearwardly of said pedals and does not extend forwardly of any portion of the rear wheel such that a user sitting on said attached seat at the selected seat position along said curved trajectory parth has an unhindered leg action in pedalling and said front section including a handle for steering of said steerable wheel, said handle being positioned relative to said seat such that a user gripping said handle and seated on said seat has his or her back in substantially upright position.

* * * * *

UNITED STATES PATENT AND TRADEMARK OFFICE
CERTIFICATE OF CORRECTION

PATENT NO.        : 6,997,470,B2
APPLICATION NO. : 10/488934
DATED             : February 14, 2006
INVENTOR(S)       : Peter David Clutton It is certified that error appears in the above-identified patent and that said Letters Patent is hereby corrected as shown below:

Delete Drawing Figure 1, and substitute therefor Drawing Figure 1. (Attached)

Signed and Sealed this

Seventeenth Day of October, 2006

JON W. DUDAS
*Director of the United States Patent and Trademark Office*

FIG. 1